US009890829B2

United States Patent
Black, Sr.

(10) Patent No.: US 9,890,829 B2
(45) Date of Patent: Feb. 13, 2018

(54) PROTECTIVE SHEET FOR VEHICLE SUSPENSION SYSTEMS AND METHOD OF INSTALLATION THEREOF

(71) Applicant: Air Spring Protection Systems, LLC, Lancaster, TX (US)

(72) Inventor: Ronnie L. Black, Sr., Wilmer, TX (US)

(73) Assignee: AIR SPRING PROTECTION SYSTEMS, LLC, Lancaster, TX (US)

( * ) Notice: Subject to any disclaimer, the term of this patent is extended or adjusted under 35 U.S.C. 154(b) by 0 days.

(21) Appl. No.: 15/099,554

(22) Filed: Apr. 14, 2016

(65) Prior Publication Data

US 2017/0299010 A1   Oct. 19, 2017

(51) Int. Cl.
*F16F 9/04* (2006.01)
*F16F 9/38* (2006.01)
*B60G 11/27* (2006.01)

(52) U.S. Cl.
CPC ............ *F16F 9/38* (2013.01); *B60G 11/27* (2013.01); *F16F 9/04* (2013.01); *B60G 2204/20* (2013.01); *B60G 2204/40* (2013.01); *F16F 2230/105* (2013.01)

(58) Field of Classification Search
CPC .......... F16F 9/04; F16F 9/0409; F16F 9/0436; F16F 9/05; F16F 9/055; F16F 9/38
See application file for complete search history.

(56) References Cited

U.S. PATENT DOCUMENTS

| | | | | |
|---|---|---|---|---|
| 4,167,992 A | * | 9/1979 | McClellan | F16F 9/38 188/322.12 |
| 2004/0026836 A1 | * | 2/2004 | Brookes | B60G 13/003 267/64.23 |
| 2004/0026837 A1 | * | 2/2004 | Ferrer | F16F 9/0454 267/64.23 |
| 2004/0100032 A1 | * | 5/2004 | Webber | F16F 9/05 277/391 |
| 2006/0208402 A1 | * | 9/2006 | Keeney | F16F 9/04 267/64.11 |
| 2007/0205546 A1 | | 9/2007 | Watanabe | |

(Continued)

FOREIGN PATENT DOCUMENTS

WO    WO 2015022102 A1 * 2/2015 ............ F16F 9/0409

*Primary Examiner* — Nicholas J Lane
(74) *Attorney, Agent, or Firm* — Jeannine M. Host; JM Host PLLC

(57) ABSTRACT

A protective sheet enveloping an air suspension module of a vehicle is disclosed. The protective sheet comprises a first edge, a second edge, a third edge, a fourth edge, and a middle portion. The first edge, the second edge, the third edge, and the fourth edge having a pleat with a plurality of incises. The third edge and the fourth edge are in a perpendicular orientation with respect to the first edge and the second edge. The middle portion having a mesh encapsulated within the pleat of the first edge, the second edge, the third edge, and the fourth edge. The protective sheet envelopes around an outer circumferential surface of the air suspension module using fastening means. The plurality of incises provide flexibility for easy installation of the protective sheet over the air suspension module. The protective sheet protects the air suspension module during operation of the vehicle.

19 Claims, 7 Drawing Sheets

(56) References Cited

U.S. PATENT DOCUMENTS

2008/0265475 A1* 10/2008 Keeney ................... F16F 9/38
                                                267/64.11
2012/0112392 A1   5/2012 Oldenettel
2017/0198779 A1*  7/2017 Batsch .................... F16F 9/38

* cited by examiner

PROTECTIVE SHEET FOR VEHICLE SUSPENSION SYSTEMS AND METHOD OF INSTALLATION THEREOF

FIELD OF THE DISCLOSURE

The presently disclosed embodiments are generally related to suspension systems employed in vehicles, and more particularly to a protective sheet wrapped around an air suspension module for protecting the air suspension module of a vehicle.

BACKGROUND

Air suspension systems are employed in a vehicle to provide various benefits, such as a smoother ride, support additional loads, among others. The air suspension systems include a flexible rubber bellow (also called a rubber sleeve) holding air to provide cushion between a movable suspension component and a frame of the vehicle. During operations, the air suspension systems are exposed to harsh environment and may also be contaminated with debris. As a result, there are chances that an outer circumferential surface of the air suspension systems may be damaged (i.e. cuts, ruptures or other damages) due to the harsh environment. The outer circumferential surface of the air suspension systems, thus requires a protective mechanism for preventing damages that lead to suspension failures due to leakage of the air.

Conventionally, there exist various protecting structures for shielding the air suspension systems of the vehicle. Such protecting structures are constructed of rigid metallic piece for protecting the air suspension systems. As a result, such protecting structures are unable to offer flexibility and easy installation over the air suspension systems. Further, it becomes cumbersome and costly to install these protecting structures. For example, the installation of such protecting structures requires complete dismantling of suspension components. Dismantling of the suspension components is time consuming and requires mounting modifications to the air suspension systems. Moreover, the protecting structures are costly, inflexible, and hence cause challenges during installation within the vehicle.

Therefore, there is a need for a protective sheet enveloping an air suspension module of the vehicle.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an embodiment, a protective sheet enveloping an air suspension module of a vehicle is disclosed. The protective sheet comprising a first edge having a pleat with a plurality of incises, a second edge having the pleat with the plurality of incises, a third edge having the pleat with the plurality of incises, the third edge being in a perpendicular orientation with respect to the first edge and the second edge, a fourth edge having the pleat with the plurality of incises, the fourth edge being in a perpendicular orientation with respect to the first edge and the second edge, and a middle portion surrounded within the first edge, the second edge, the third edge, and the fourth edge. The middle portion having a mesh encapsulated within the pleat of the first edge, the second edge, the third edge, and the fourth edge. The protective sheet envelopes around an outer circumferential surface of the air suspension module using fastening means. The plurality of incises provide flexibility for easy installation of the protective sheet over the air suspension module. The protective sheet protects the air suspension module during operation of the vehicle.

In another embodiment, a suspension system for a vehicle is disclosed. The suspension system includes an air suspension module, and a protective sheet. The air suspension module supported within the vehicle, the air suspension module having an outer circumferential surface and an inner circumferential surface defining an interior cavity for holding air suspension means. The protective sheet enveloping the outer circumferential surface of the air suspension module, the protective sheet is flexible for easy installation over the air suspension module and protects the air suspension module during operation of the vehicle.

In a yet another embodiment, a method for installing a protective sheet around an air suspension module of a vehicle is disclosed. The method comprises placing a first edge of the protective sheet on a portion of an outer circumferential surface of the air suspension module, enveloping the protective sheet over a remaining portion of the outer circumferential surface of the air suspension module to completely cover the air suspension module till a second edge of the protective sheet is in proximity to the first edge, wherein the enveloping of the protective sheet is performed around a vertical axis of the air suspension module, and coupling the first edge with the second edge via fastening means while the protective sheet completely covers the outer circumferential surface of the air suspension module. The protective sheet having a plurality of incises to provide flexibility for easy installation of the protective sheet over the air suspension module. The protective sheet protects the air suspension module during operation of the vehicle.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
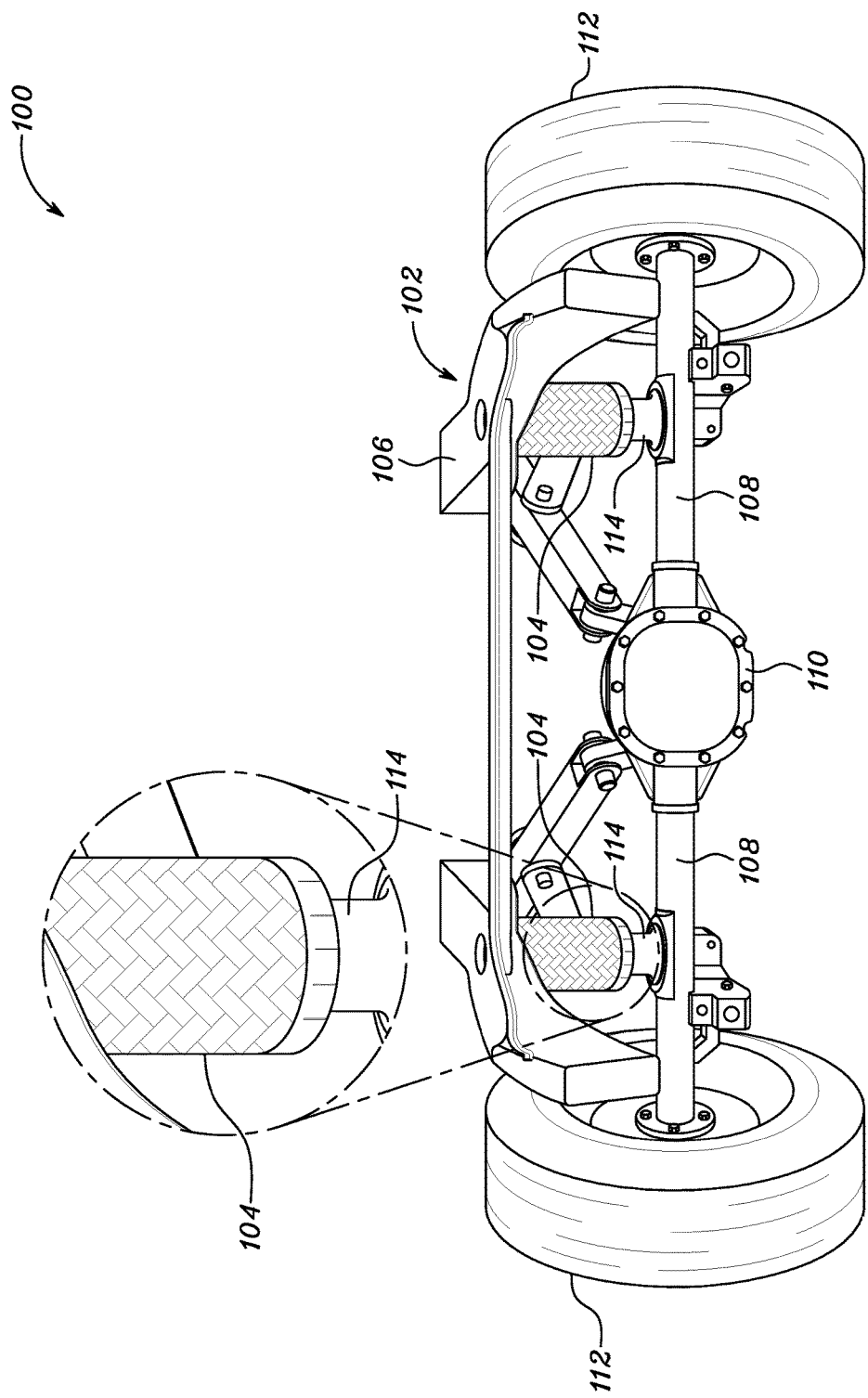
FIG. 1 illustrates a vehicle having an air suspension system utilizing a protective sheet, in accordance with the embodiments of the present disclosure.

FIG. 1 illustrates a vehicle 100 having a suspension system 102 utilizing a protective sheet 104, in accordance with the embodiments of the present disclosure. The vehicle 100 includes a frame 106, wheel axles 108, a differential 110, wheels 112, among others. The suspension system 102 may include other components which are linked together to support weight of the vehicle 100 and absorb road shocks.

Figure 4:
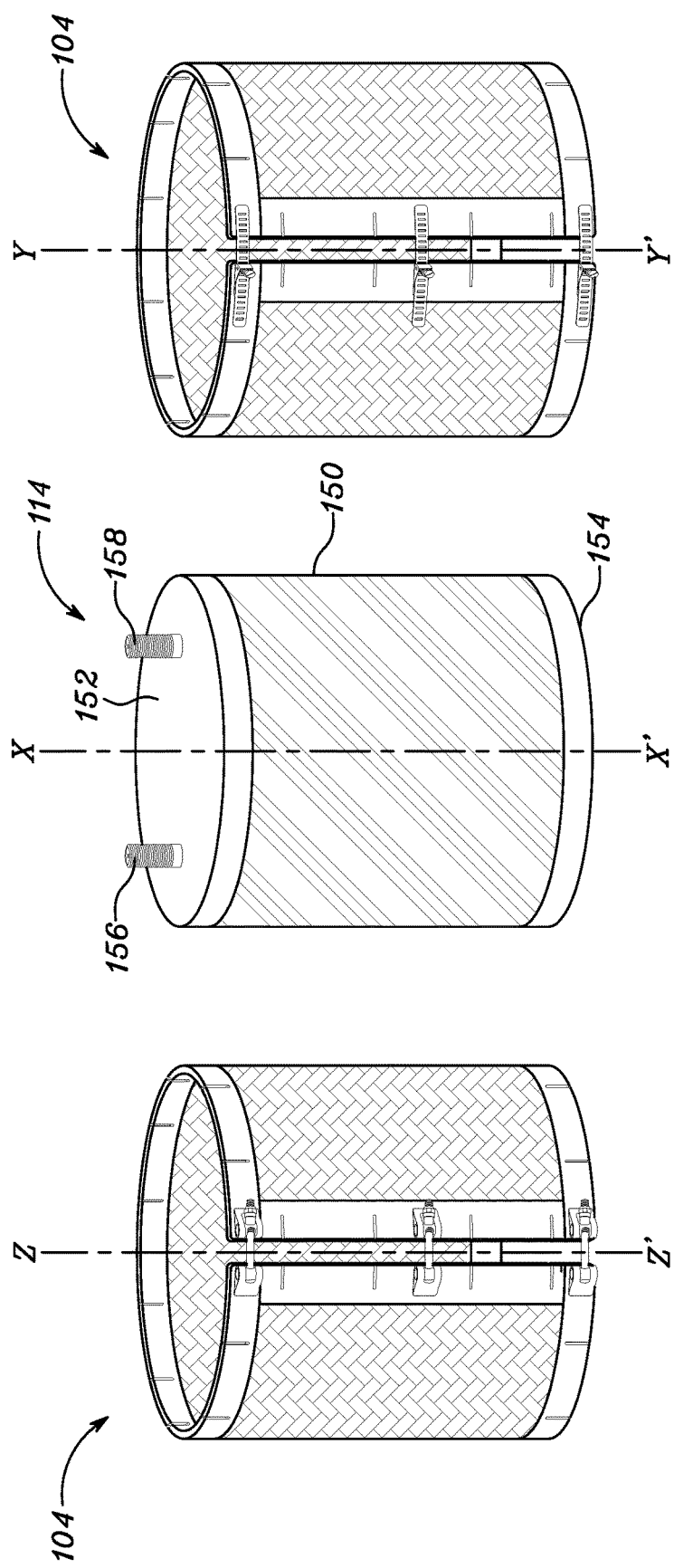
FIG. 4 illustrates an air suspension module and the protective sheets in folded configurations, in accordance with the embodiments of the present disclosure.

The suspension system 102 includes an air suspension module 114 having air suspension means, i.e. a rubber bellow to store compressed air (as described in FIG. 4). The rubber bellow absorbs shocks by relative movement between the frame 106 and the wheel axles 108. The wheels axles 108 reciprocate when the wheels 112 experience road shocks and transfer the road shocks. It will be apparent to the person skilled in the art that the air suspension module 114 are connected to hoses and other similar compressed air supply units controlled by a controller unit (not shown).

Referring to FIG. 1, the wheel axles 108 extend from the differential 110 and are connect to the wheels 112. The movements caused by road irregularities are transferred from the wheel axles 108 into the air suspension module 114 for absorption of road shocks, etc. The protective sheet 104 is wrapped around an outer circumferential surface 150 (as shown in FIG. 4) of the air suspension module 114 via fastening means. In an embodiment, the fastening means comprises first fastening means 132 and second fastening means 142 (as described in FIG. 2, and FIG. 3). The protective sheet 104 provides protection from debris in roadway which can damage the air suspension module 114 and cause blowouts. It will be apparent to one skilled in the art that the protective sheet 104 may be used in any other suspension system of the vehicle 100, such as tractor-trailor rigs, Lorries or any other applications without departing from the meaning and scope of the invention.

Figure 2:
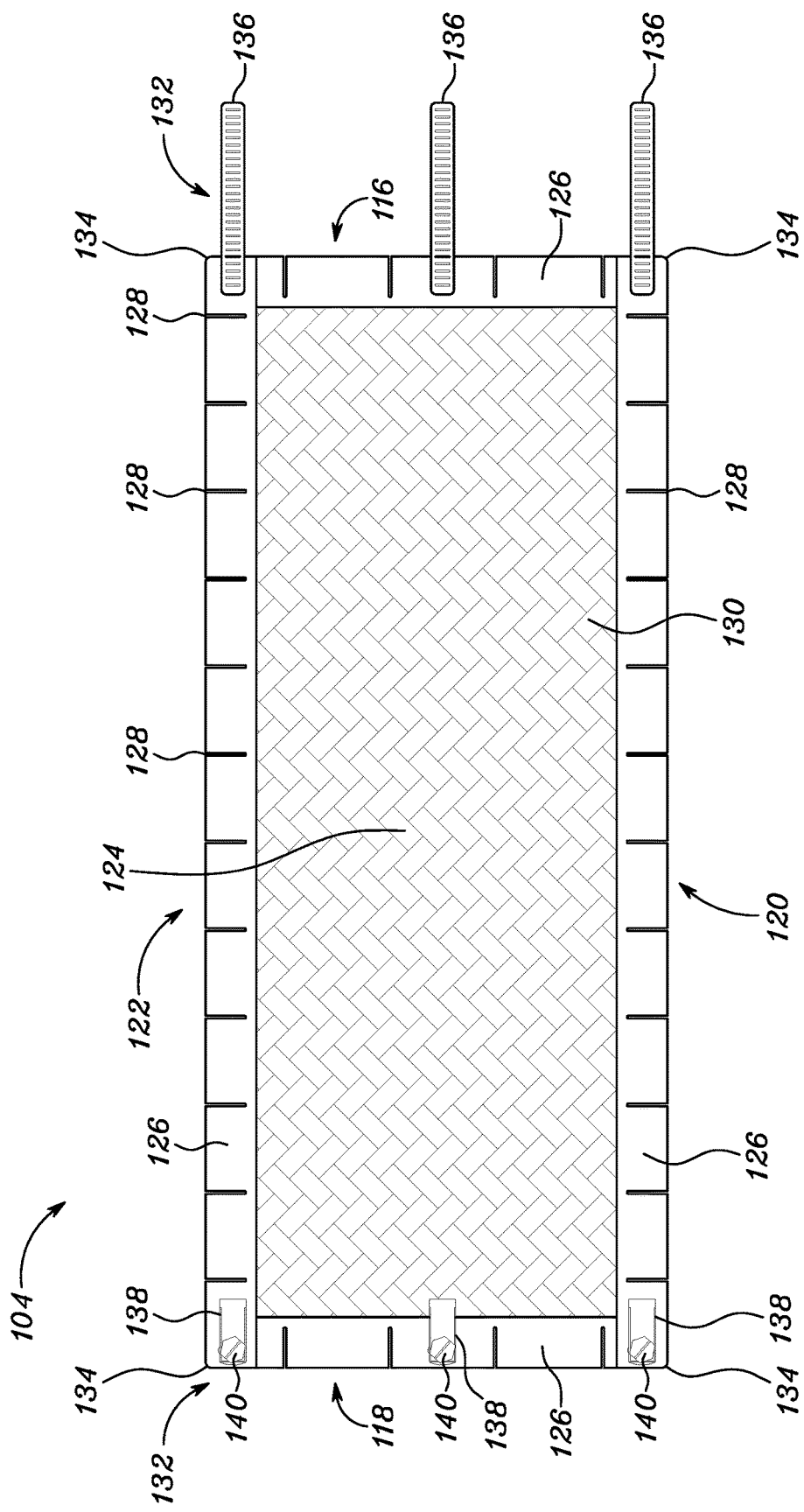
FIG. 2 illustrates the protective sheet having first fastening means, in accordance with the embodiments of the present disclosure.

FIG. 2 illustrates the protective sheet 104 having the first fastening means 132, in accordance with the embodiments of the present disclosure. The protective sheet 104 includes a first edge 116, a second edge 118, a third edge 120, a fourth edge 122, and a middle portion 124. In an embodiment, the first edge 116 and the second edge 118 are in a parallel orientation from each other and the third edge 120 and the fourth edge 122 are in a parallel orientation from each other. The first edge 116, the second edge 118, the third edge 120, and the fourth edge 122 having a pleat 126 with a plurality of incises 128. The third edge 120 and the fourth edge 122 are in a perpendicular orientation with respect to the first edge 116 and the second edge 118. The middle portion 124 is surrounded within the first edge 116, the second edge 118, the third edge 120, and the fourth edge 122. The middle portion 124 having a mesh 130 encapsulated within the pleat 126 of the first edge 116, the second edge 118, the third edge 120, and the fourth edge 122.

Referring to FIG. 2, in an embodiment, the pleat 126 is a metallic pleat covering the first edge 116, the second edge 118, the third edge 120 and the fourth edge 122 of the protective sheet 104. The pleat 126 is welded on all points of contact with the mesh 130 of the middle portion 124 to aid integrity. It will be apparent to the person skilled in the art that the pleat 126 may be fabricated in any other configurations, shape and design for holding the mesh 130 without departing from the meaning and scope of the disclosure.

Referring to FIG. 2, the protective sheet 104 having corners 134, when the pleat 126 is folded for encapsulating the mesh 130 over all edges of the protective sheet 104. In a preferred embodiment, the protective sheet 104 having the mesh 130 consists of a 12" wide by 38" long section of 96×(17×0.025)–304 series braided stainless steel mesh with 2.25" of 0.042"–201 series stainless steel strips folded around the third edge 120 and the fourth edge 122 and welded to the mesh 130 on both sides, capping the top and bottom of the mesh 130 off with 1" bands. It will be apparent to the person skilled in the art that the dimensions, measurements, any such values, etc. as described above are exemplary and may be varied to carry out the invention without departing from the meaning and scope of the disclosure. During operations, the mesh 130 offers flexibility and impact absorption, and thus protects the air suspension module 114. In an embodiment, the mesh 130 is a flexible mesh formed from materials including at least one of a steel material, an armor material, and a composite material.

Referring to FIG. 2, the plurality of incises 128 provides flexibility to the protective sheet 104. As a result, the protective sheet 104 is easily wrapped around the air suspension module 114 and also absorbs volumetric expansion of the air suspension module 114. It will be apparent to the person skilled in the art that the plurality of incises 128 may be of any shape, depth, patterns, without departing from the meaning and scope of the disclosure.

Referring to FIG. 2, the first fastening means 132 include a first member 136 and a second member 138 having a tightening member 140. The first member 136 is connected with the first edge 116 and the second member 138 is connected to the second edge 118. It will be apparent to the person skilled in the art that the first member 136 and the second member 138 may be connected to either of the first edge 116 and the second edge 118 without departing from the meaning and scope of the disclosure. The second member 138 is adapted to receive the first member 136 for coupling the first edge 116 with the second edge 118. The wrapping strength of the protective sheet 104 may be adjusted with the help of the tightening member 140 as per the requirements. In an embodiment, the first fastening means 132 is a pipe clamp arrangement. It will be apparent to one skilled in the art that the protective sheet 104 may employ other types of fastening means without departing from the meaning and scope of the disclosure.

Figure 3:
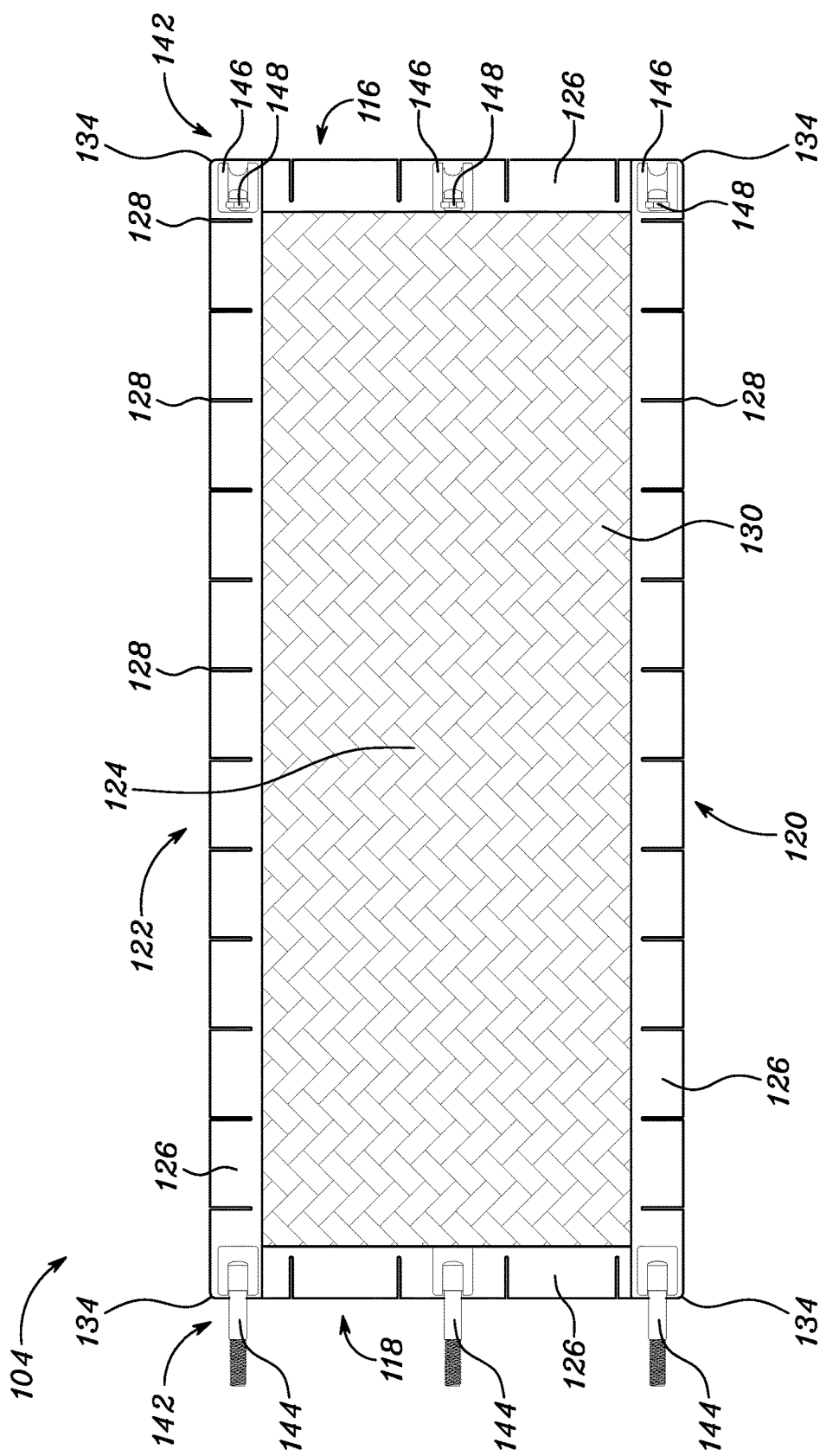
FIG. 3 illustrates the protective sheet having second fastening means, in accordance with the embodiments of the present disclosure.

FIG. 3 illustrates the protective sheet 104 having the second fastening means 142, in accordance with the embodiments of the present disclosure. The protective sheet 104 includes the first edge 116, the second edge 118, the third edge 120, the fourth edge 122, and the middle portion 124. In an embodiment, the first edge 116 and the second edge 118 are in a parallel orientation from each other and the third edge 120 and the fourth edge 122 are in a parallel orientation from each other. The first edge 116, the second edge 118, the third edge 120, and the fourth edge 122 having the pleat 126 with the plurality of incises 128. The third edge 120 and the fourth edge 122 are in a perpendicular orientation with respect to the first edge 116 and the second edge 118. The middle portion 124 is surrounded within the first edge 116, the second edge 118, the third edge 120, and the fourth edge 122. The middle portion 124 having a mesh 130 encapsulated within the pleat 126 of the first edge 116, the second edge 118, the third edge 120, and the fourth edge 122.

Referring to FIG. 3, in an embodiment, the pleat 126 is a metallic pleat covering the first edge 116, the second edge 118, the third edge 120 and the fourth edge 122 of the protective sheet 104. The pleat 126 is welded on all points of contact with the mesh 130 of the middle portion 124 to aid integrity. It will be apparent to the person skilled in the art that the pleat 126 may be fabricated in any other configurations, shape and design for holding the mesh 130 without departing from the meaning and scope of the disclosure.

Referring to FIG. 3, the protective sheet 104 having the corners 134, when the pleat 126 is folded for encapsulating the mesh 130 over all edges of the protective sheet 104. In a preferred embodiment, the protective sheet 104 having the mesh 130 consists of a 12" wide by 38" long section of 96×(17×0.025)–304 series braided stainless steel mesh with 2.25" of 0.042"–201 series stainless steel strips folded around the third edge 120 and the fourth edge 122 and welded to the mesh 130 on both sides, capping the top and bottom of the mesh 130 off with 1" bands. It will be apparent to the person skilled in the art that the dimensions, measurements, any such values, etc. as described above are exemplary and may be varied to carry out the invention without departing from the meaning and scope of the disclosure. During operations, the mesh 130 offers flexibility and impact absorption, and thus protects the air suspension module 114. In an embodiment, the mesh 130 is a flexible mesh formed from materials including at least one of a steel material, an armor material, and a composite material.

Referring to FIG. 3, the plurality of incises 128 provides flexibility to the protective sheet 104. As a result, the protective sheet 104 is easily wrapped around the air suspension module 114 and also absorbs volumetric expansion of the air suspension module 114. It will be apparent to the person skilled in the art that the plurality of incises 128 may be of any shape, depth, patterns, without departing from the meaning and scope of the disclosure.

Referring to FIG. 3, the second fastening means 142 include a first fastening member 144 and a second fastening member 146 having a tightening arrangement 148. The first fastening member 144 is connected with the second edge 118 and the second fastening member 146 is connected to the first edge 116. It will be apparent to the person skilled in the art that the first fastening member 144 and the second fastening member 146 may be connected to any of the first edge 116 and the second edge 118 without departing from the meaning and scope of the disclosure. The second fastening member 146 is adapted to receive the first fastening member 144 for coupling the first edge 116 with the second edge 118. The wrapping strength of the protective sheet 104 may be adjusted with the help of the tightening arrangement 148 as per the requirements. In an embodiment, the second fastening means 142 comprises a clamp arrangement. It will be apparent to one skilled in the art that the protective sheet 104 may employ other kind of fastening means for enveloping of the protective sheet 104 around the air suspension module 114 without departing from the meaning and scope of the disclosure.

FIG. 4 illustrates the air suspension module 114 and the protective sheets 104 in folded configurations, in accordance with the embodiments of the present disclosure. The air suspension module 114 is supported within the vehicle 100 (as shown in FIG. 1). The air suspension module 114 having an outer circumferential surface 150, an inner circumferential surface (not shown) which defines an interior cavity (not shown) for holding air suspension means, i.e. an air bellow holding the compressed air. The air suspension module 114 further has a top surface 152 and a bottom surface 154. The top surface 152 includes an input 156 and an output 158. The air suspension module 114 stores the compressed air for shock absorption when road shocks occur. The input 156 and the output 158 allow addition and extraction of the compressed air from the air suspension module 114 to aid load handling characteristics of the vehicle 100. The air suspension module 114 is constructed of a flexible material, such as rubber, or any other material.

Referring to FIG. 4, the air suspension module 114 is installed within the vehicle 100 along a vertical axis X-X'. The protective sheets 104 are in folded configurations having a vertical axis Y-Y' and a vertical axis Z-Z'. Either of the protective sheet 104 is enveloped around the outer circumferential surface 150 of the air suspension module 114 in such a way such that the vertical axis X-X' of the air suspension module 114 overlaps with the vertical axis Y-Y', Z-Z' of either of the protective sheet 104. As a result, the protective sheet 104 accurately wraps around the air suspension module 114. The protective sheet 104 is configured to provide symmetrical covering around the air suspension module 114 of the vehicle 100. The shape and design of the protective sheet 104 may vary with reference to shapes, sizes, weight, thickness, etc. without departing from the meaning and scope of the disclosure. It will be apparent to one skilled in the art that the protective sheet 104 may be enveloped around the air suspension module 114 in any other orientation and/or manner without departing from the meaning and scope of the disclosure.

Figure 5:
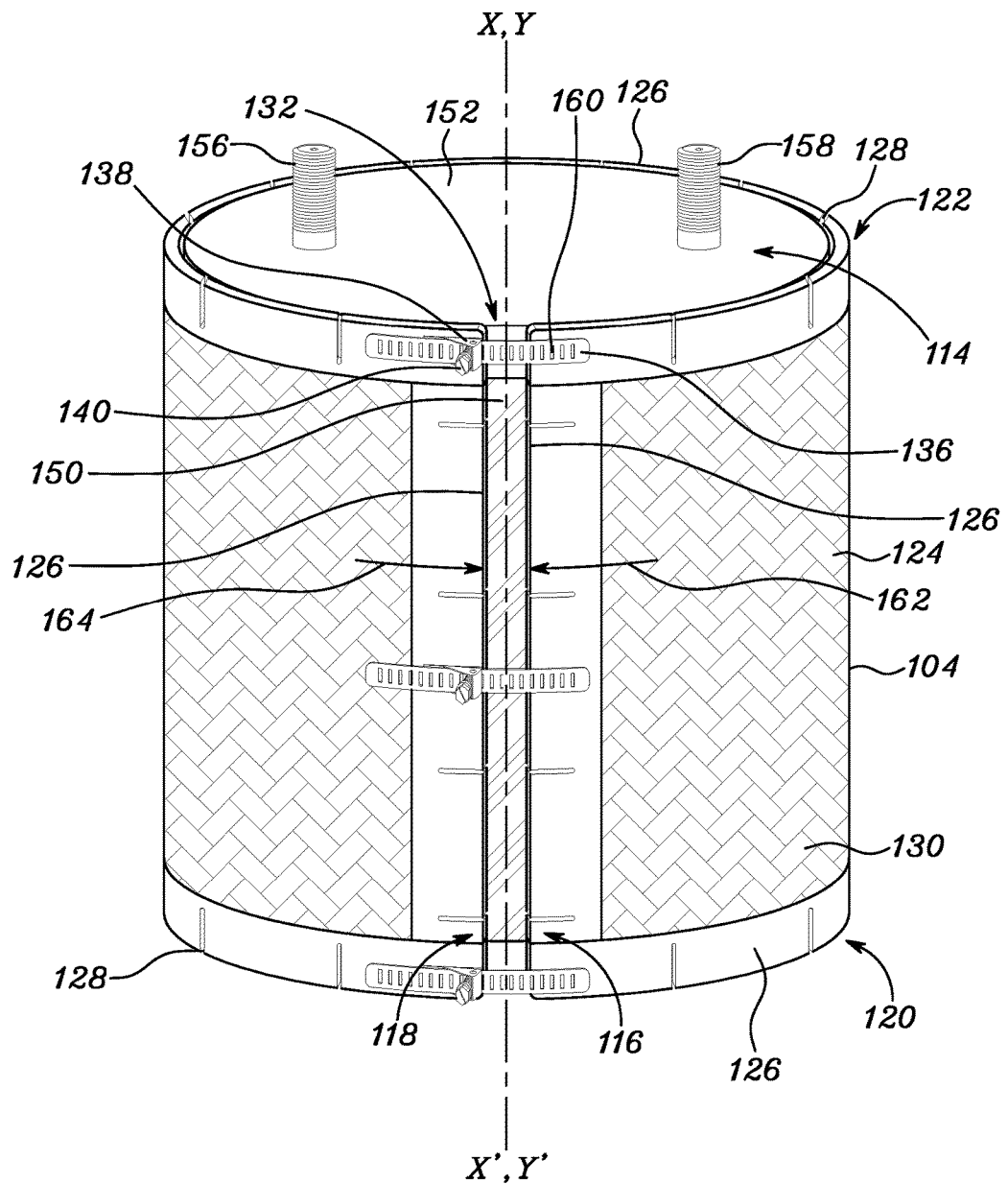
FIG. 5 illustrates the protective sheet with the first fastening means wrapped around the air suspension module, in accordance with the embodiments of the present disclosure.

FIG. 5 illustrates the protective sheet 104 with the first fastening means 132 wrapped around the air suspension module 114, in accordance with the embodiments of the present disclosure. The protective sheet 104 having the first member 136 and the second member 138 with the tightening member 140. The first member 136 includes multiple corrugations 160 that facilitates grip and also prevents the protective sheet 104 from coming loose during operations of the air suspension module 114. The first member 136 is received by the second member 138. The first member 136 is tightened via the tightening member 140 over the corrugations 160. The coupling of the first member 136 and the second member 138 is achieved in the direction as shown by arrows 162, 164. The tightening member 140 is configured to secure the protective sheet 104 around the outer circumferential surface 150 of the air suspension module 114. In this configuration, the vertical axis Y-Y' of the protective sheet 104 overlaps with the vertical axis X-X' of the air suspension module 114. As per the requirements, the tightening member 140 is also configured to adjust the tightness and looseness of the protective sheet 104 around the outer circumferential surface 150 of the air suspension module 114. The protective sheet 104 is easily wrapped around the air suspension module 114 and efficiently absorbs volumetric expansion and/or height variation of the air suspension module 114 during operations of the vehicle 100. It would be apparent to the person skilled in the art that the air suspension module 114 wrapped with the protective sheet 104 is protected from the roadway debris and damages while also being easily retrofitted with the air suspension module 114. It will be apparent to one skilled in the art that the protective sheet 104 in this embodiment may be easily installed on the vehicle 100 without dismantling of the air suspension module 114 of the vehicle 100, without departing from the meaning and scope of the disclosure.

Figure 6:
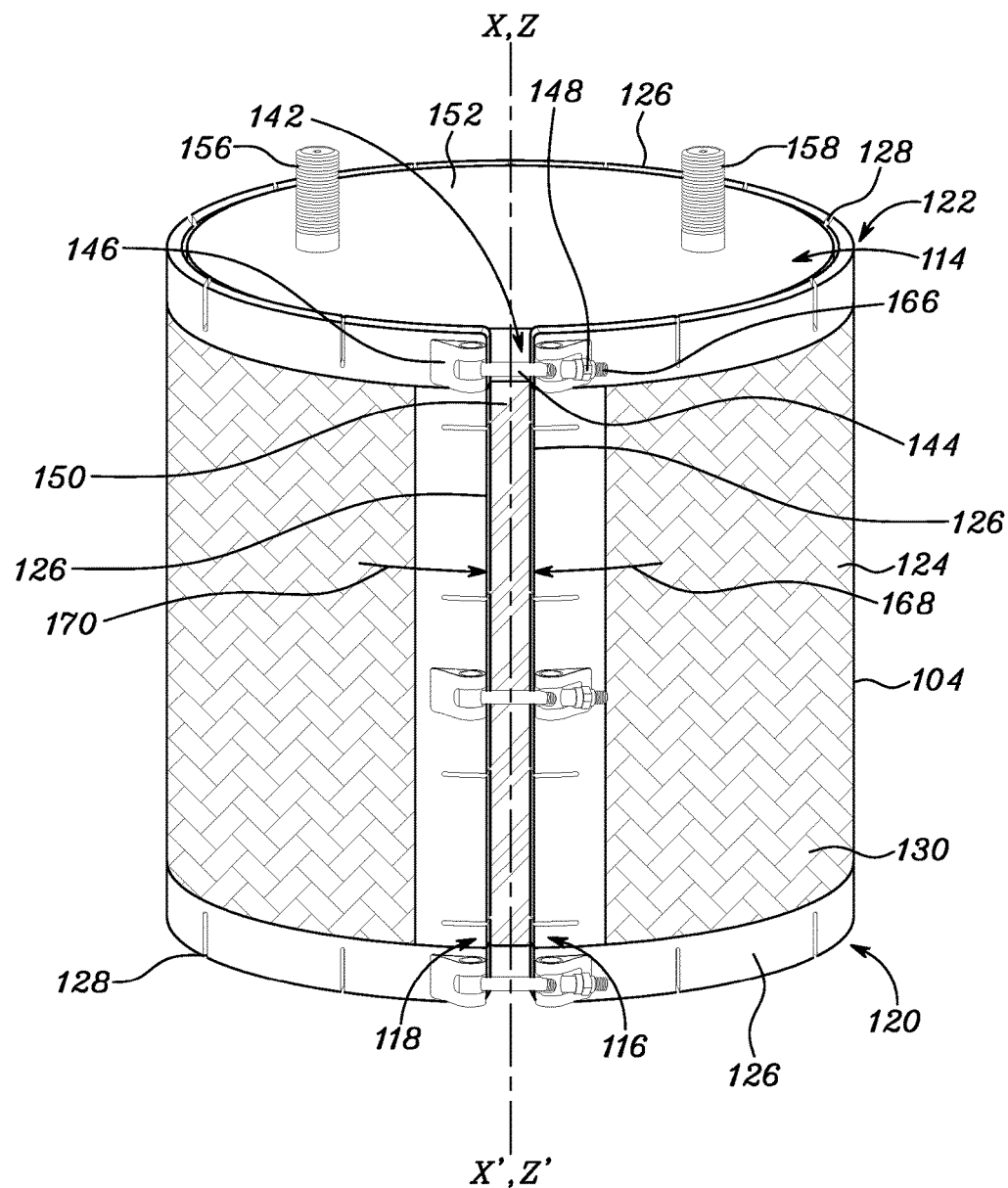
FIG. 6 illustrates the protective sheet with the second fastening means wrapped around the air suspension module, in accordance with the embodiments of the present disclosure.

FIG. 6 illustrates the protective sheet 104 with the second fastening means 142 wrapped around the air suspension module 114, in accordance with the embodiments of the present disclosure. The protective sheet 104 having the first fastening member 144 and the second fastening member 146 with the tightening arrangement 148. The first fastening member 144 includes threads 166 that are tightened via the tightening arrangement 148 of the second fastening member 146 to facilitate grip and prevent the protective sheet 104 from coming loose during operations of the air suspension module 114. The coupling of the first fastening member 144 and the second fastening member 146 is achieved in the direction as shown by arrows 168, 170. In this configuration, the vertical axis Z-Z' of the protective sheet 104 overlaps with the vertical axis X-X' of the air suspension module 114. The threads 166 are configured to secure the protective sheet 104 around the outer circumferential surface 150 of the air suspension module 114. As per the requirements, the threads 166 are also configured to adjust the tightness and looseness of the protective sheet 104 around the outer circumferential surface 150 of the air suspension module 114. The protective sheet 104 is easily wrapped around the air suspension module 114 and efficiently absorbs volumetric expansion and/or height variation of the air suspension module 114 during operations of the vehicle 100. It would be apparent to the person skilled in the art that the air suspension module 114 wrapped with the protective sheet 104 is protected from the roadway debris and damages while also being easily retrofitted with the air suspension module 114. It will be apparent to one skilled in the art that the protective sheet 104 in this embodiment may be easily installed on the vehicle 100 without dismantling of the air suspension module 114 of the vehicle 100, without departing from the meaning and scope of the disclosure. It will be apparent to the person skilled in the art that the protective sheet 104 can be attached to the air suspension module 114 by other installation procedures not described herein without departing from the meaning and scope of the disclosure.

Figure 7:
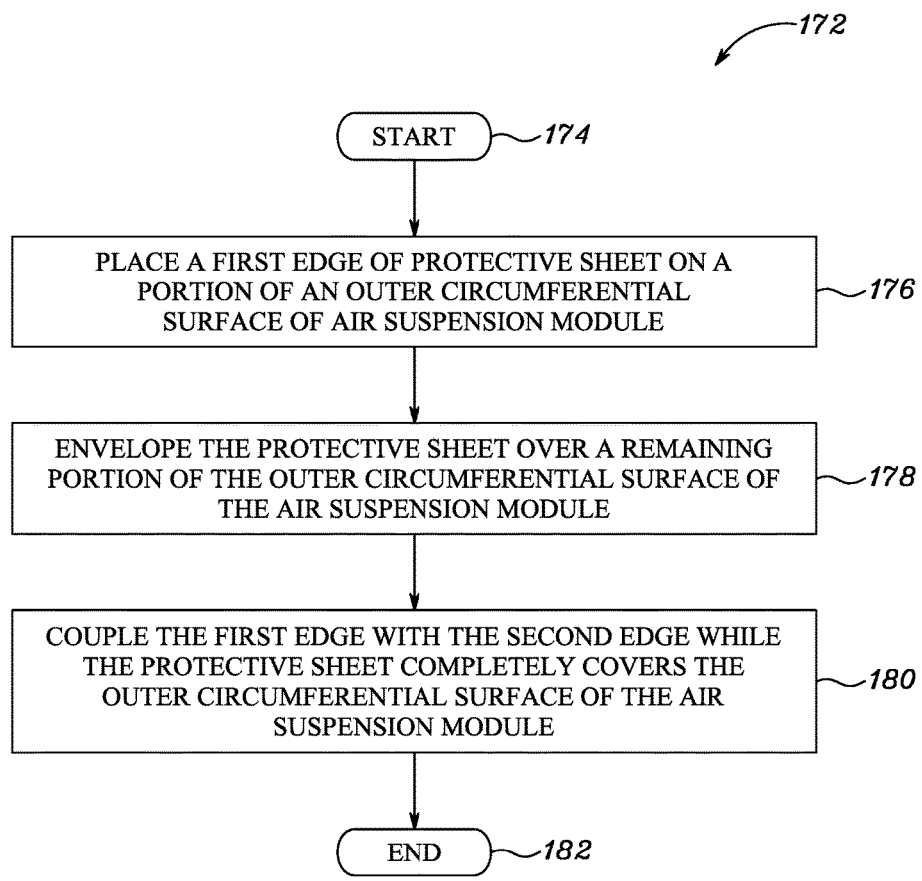
FIG. 7 illustrates a flow chart of a method for installing the protective sheet around the air suspension module of the vehicle, in accordance with the embodiments of the present disclosure.

FIG. 7 illustrates a flow chart of a method 172 for installing the protective sheet 104 around the air suspension module 114 of the vehicle 100, in accordance with the embodiments of the present disclosure. The method 172 is described in conjunction with FIGS. 1-6.

The method 172 starts at step 174 and moves to step 176. At step 176, the first edge 116 of the protective sheet 104 is placed on a portion of the outer circumferential surface 150 of the air suspension module 114. During installation procedure, the first edge 116 of the protective sheet 104 is positioned in parallel to the vertical axis X-X' of the air suspension module 114.

At step 178, the protective sheet 104 is enveloped over a remaining portion of the outer circumferential surface 150 of the air suspension module 114. The protective sheet 104 is enveloped over a remaining portion of the outer circumferential surface 150 of the air suspension module 114 to completely cover the air suspension module 114 till the second edge 118 of the protective sheet 104 is in proximity to the first edge 116. The enveloping of the protective sheet 104 is performed around the vertical axis X-X' of the air suspension module 114. As a result, a complete covering of the air suspension module 114 is achieved as the first edge 116 and the second edge 118 are parallel and at close proximity with respect to each other. The protective sheet 104 may be assembled or installed on the vehicle 100 without dismantling of the air suspension module 114.

At step 180, the first edge 116 is coupled with the second edge 118 via the fastening means (i.e. the first fastening means 132, the second fastening means 142) while the protective sheet 104 completely covers the outer circumferential surface 150 of the air suspension module 114. As per the requirements, the fastening means (i.e. the first fastening means 132, the second fastening means 142) are also configured to adjust the tightness of the protective sheet 104 around the outer circumferential surface 150 of the air suspension module 114. In such procedures, the vertical axis Z-Z', Y-Y' for either of the protective sheet 104 (as shown in FIG. 5, 6) overlaps with the vertical axis X-X' of the air suspension module 114. It will be apparent to the person skilled in the art that the protective sheet 104 may be wrapped (or enveloped) around the air suspension module 114 by other methods/procedures not described herein without departing from the meaning and scope of the disclosure. The method 172 proceeds to step 182 at which the method 172 ends.

Embodiments of the present invention offer various advantages. The protective sheet 104 is flexible for easy wrapping around the air suspension module 114 of the vehicle 100. The protective sheet 104 is easily folded with a small wrench and is enveloped around the air suspension module 114. The protective sheet 104 is flexible to accommodate volumetric changes of the air suspension module 114 during operations of the vehicle 100. The protective sheet 104 has a compact size, and hence can be easily packaged and shipped. Further, the protective sheet 104 has a nominal weight, and offers easy installation. Furthermore, the protective sheet 104 is easily manufactured and offers cost effective solution. The protective sheet 104 is easily attached to and detached from the air suspension module 114 without dismantling the air suspension module 114 from the vehicle 100.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In the foregoing description, certain terms have been used for brevity, clearness, and understanding. No unnecessary limitations are to be implied there from beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A protective sheet enveloping an air suspension module of a vehicle, the protective sheet comprising:
    a first edge having a first pleat with a first plurality of incises;
    a second edge having a second pleat with a second plurality of incises;
    a third edge having a third pleat with a third plurality of incises, the third edge being in a perpendicular orientation with respect to the first edge and the second edge;
    a fourth edge having a fourth pleat with a fourth plurality of incises, the fourth edge being in a perpendicular orientation with respect to the first edge and the second edge; and
    a middle portion surrounded within the first edge, the second edge, the third edge, and the fourth edge, the middle portion having a mesh encapsulated within the pleat of the first edge, the pleat of the second edge, the pleat of the third edge, and the pleat of the fourth edge,
    wherein the protective sheet envelopes around an outer circumferential surface of the air suspension module using fastening means, the first, second, third and fourth plurality of incises provide flexibility for installation of the protective sheet over the air suspension module and also protects the air suspension module during operation of the vehicle.

2. The protective sheet of claim 1, wherein the first second, third and fourth pleat is a metallic pleat covering the first edge, the second edge, the third edge and the fourth edge of the protective sheet.

3. The protective sheet of claim 1, wherein the protective sheet protects the air suspension module from damages caused by blow-outs and debris.

4. The protective sheet of claim 1, wherein the mesh obstructs an external force impacted on the protective sheet.

5. The protective sheet of claim 1, wherein the mesh is formed from a material comprising at least one of a steel material, an armor material, and a composite material.

6. The protective sheet of claim 1, wherein the protective sheet is attached to and detached from the air suspension module without dismantling the air suspension module from the vehicle.

7. The protective sheet of claim 1, wherein the fastening means comprises first fastening means and second fastening means.

8. A suspension system for a vehicle comprising:
    an air suspension module supported within the vehicle, the air suspension module having an outer circumferential surface and an inner circumferential surface defining an interior cavity for holding air suspension means; and
    a protective sheet having four edges, wherein the four edges comprise a metallic pleat and/or a plurality of incises, enveloping the outer circumferential surface of the air suspension module, the protective sheet is flexible for installation over the air suspension module and protects the air suspension module during operation of the vehicle.

9. The suspension system of claim 8, wherein the protective sheet protects the air suspension module from damages caused by blow-outs and debris.

10. The suspension system of claim 8, wherein the protective sheet is enveloped around the outer circumferential surface of the air suspension module via fasteners.

11. The suspension system of claim 10, wherein the protective sheet comprises a mesh extending between a first edge and a second edge of the protective sheet.

12. The suspension system of claim 11, wherein the mesh obstructs an external force impacted on the protective sheet.

13. The suspension system of claim 11, wherein the mesh is formed from a material comprising at least one of a steel material, an armor material, and a composite material.

14. The suspension system of claim 8, wherein the protective sheet is attached to and detached from the air suspension module without dismantling the air suspension module from the vehicle.

15. A method for installing a protective sheet around an air suspension module of a vehicle, the method comprising:
    placing a first edge of the protective sheet on a portion of an outer circumferential surface of the air suspension module;
    enveloping the protective sheet over a remaining portion of the outer circumferential surface of the air suspension module to completely cover the air suspension module till a second edge of the protective sheet is in proximity to the first edge, wherein the enveloping of the protective sheet is performed around a vertical axis of the air suspension module; and coupling the first edge with the second edge via fastening means while the protective sheet completely covers the outer circumferential surface of the air suspension module, wherein the protective sheet has a plurality of incises to provide flexibility for installation of the protective sheet over the air suspension module and further protects the air suspension module during operation of the vehicle.

16. The method of claim 15, wherein coupling the first edge with the second edge is done via fasteners.

17. The method of claim 15 further comprising protecting the air suspension module from damages caused by blowouts and debris.

18. The method of claim 15 further comprising obstructing an external force impacted on the protective sheet.

19. The method of claim 15 further comprising attaching and detaching the protective sheet with the air suspension module without dismantling the air suspension module from the vehicle.

\* \* \* \* \*